United States Patent [19]

Buijsingh et al.

[11] Patent Number: 5,219,982
[45] Date of Patent: Jun. 15, 1993

[54] PROCESS FOR COPOLYMERIZING CO/OLEFIN

[75] Inventors: Paulus D. Buijsingh; Izaak Lindhout, both of The Hague, Netherlands

[73] Assignee: Shell Oil Company, Houston, Tex.

[21] Appl. No.: 860,525

[22] Filed: Mar. 30, 1992

[30] Foreign Application Priority Data

May 29, 1991 [EP] European Pat. Off. ........ 91201318

[51] Int. Cl.$^5$ .............................................. C08G 67/02
[52] U.S. Cl. ...................... 528/392; 526/67
[58] Field of Search ............................ 528/392; 526/67

[56] References Cited

U.S. PATENT DOCUMENTS

| 4,808,699 | 2/1989 | Van Broekhoven et al. | 528/392 |
| 5,001,221 | 3/1991 | Van Broekhoven | 528/392 |
| 5,021,547 | 6/1991 | Gautier et al. | 528/392 |

FOREIGN PATENT DOCUMENTS

| 070797 | 7/1981 | European Pat. Off. |
| 340844 | 11/1989 | European Pat. Off. |
| 412620 | 2/1991 | European Pat. Off. |
| 81/02988 | 4/1980 | PCT Int'l Appl. |

OTHER PUBLICATIONS

Search Report EPO enclosed. Jul. 1992.

J. H. Perry, "Chemical Engineers' Handbook", 3rd Edition (1953), p. 1285, FIG. 61; p. 1203, FIG. 2.
G. G. Brown et al, "Unit Operations", 4th Edition (1953), p. 194, FIG. 210.

*Primary Examiner*—Harold D. Anderson

[57] ABSTRACT

An improved process for the production of linear alternating polymers of carbon monoxide and at least one ethylenically unsaturated hydrocarbon comprises (1) contacting carbon monoxide and ethylenically unsaturated hydrocarbon monomers in a reactor under polymerization conditions in the presence of a liquid reaction diluent and a catalyst composition formed from a compound of palladium, the anion of a strong non-hydrohalogenic acid and a bidentate ligand of phosphorus, (2) removing a portion of the resulting suspension of polymer in reaction diluent from the reactor, passing a part of that portion from the reactor system and passing the remainder of the portion through means for applying mechanical shear and back to the reactor, and (3) removing unreacted monomers from the gas cap in the reactor, mixing the removed unreacted monomers with carbon monoxide and ethylenically unsaturated hydrocarbon and passing the mixture through the means for applying mechanical shear and back to the reactor.

13 Claims, 1 Drawing Sheet

PROCESS FOR COPOLYMERIZING CO/OLEFIN

FIELD OF THE INVENTION

This invention relates to an improved process for the production of linear alternating polymers of carbon monoxide and at least one ethylenically unsaturated hydrocarbon. More particularly, it relates to such a process whereby the polymer product is obtained at a good rate and has a relatively high bulk density.

BACKGROUND OF THE INVENTION

The production of linear alternating polymers of carbon monoxide and at least one ethylenically unsaturated hydrocarbon is well known in the art. Such polymers, also known as polyketones or polyketone polymers, are of the repeating formula

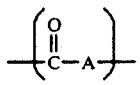

(I)

wherein A represents a moiety derived from at least one ethylenically unsaturated hydrocarbon polymerized through the ethylene unsaturation thereof. The scope of the process of producing the polyketone polymers is extensive but, without wishing to be limited, a preferred method of polymerization comprises contacting the carbon monoxide and hydrocarbon monomers under polymerization conditions in the presence of a catalyst composition formed from a compound of palladium, an anion of a strong non-hydrohalogenic acid and a bidentate ligand of phosphorus, nitrogen or sulfur. In the embodiment where the process is conducted in a liquid phase in the presence of a liquid reaction diluent, the polymer product is obtained as a material substantially insoluble in the reaction diluent. In these liquid phase processes, it is useful to facilitate contacting of reactants and catalyst composition by providing some means of agitation such as shaking or stirring.

It is also known that the nature of the stirring, particularly in large scale reactors, has an influence on the rate of polymer production. As the agitation is increased the power transmitted to the polymer suspension is also increased and the rate of polymerization increases as well. The rate of polymerization will increase only up towards a maximum polymerization rate and further increases in the power transmitted, also known as power density, will not result in a proportionate increase in reaction rate. This effect is described in greater detail in application Ser. No. 676,159 filed Mar. 27, 1991. It is also known from this reference that increases in power density also result in higher bulk density for the polyketone product. When the polymer has a higher bulk density there will be more polymer produced per unit volume of polymer suspension. Moreover, the volume of diluent adsorbed on the polymer particles per unit of polymer is also lower and product-/diluent separation becomes easier. It would therefore be of advantage to provide an improved process of producing linear alternating polymers of carbon monoxide and at least one ethylenically unsaturated hydrocarbon wherein polymer product of relatively high bulk density is produced at a good rate.

SUMMARY OF THE INVENTION

The present invention provides an improved process for the production of linear alternating polymers of carbon monoxide and at least one ethylenically unsaturated hydrocarbon wherein a polymer product of relatively high bulk density is produced. More particularly, the present invention provides such a process conducted in the presence of a liquid reaction diluent in one reactor, or in a plurality of reactors arranged in series, wherein each reactor provides for withdrawal of at least a portion of the suspension of polymer product in the reaction diluent, subjecting a part of the withdrawn suspension to a region of mechanical shear and returning the resulting suspension to the polymerization reactor. The part of the withdrawn suspension which is not recycled is separated into diluent and polymer product. The polyketone polymer is obtained as particles of more spherical shape and more uniform particle diameter.

DESCRIPTION OF THE FIGURE

The sole figure depicts a single polymerization reactor and related equipment which is suitable for the conduct of the process of the present invention. The Figure includes a polymerization reactor 7 including a region of mechanical shear 3, a polymer product suspension loop 11, 13 and 2 and a vapor recycle loop 4.

DESCRIPTION OF THE INVENTION

Figure 1:
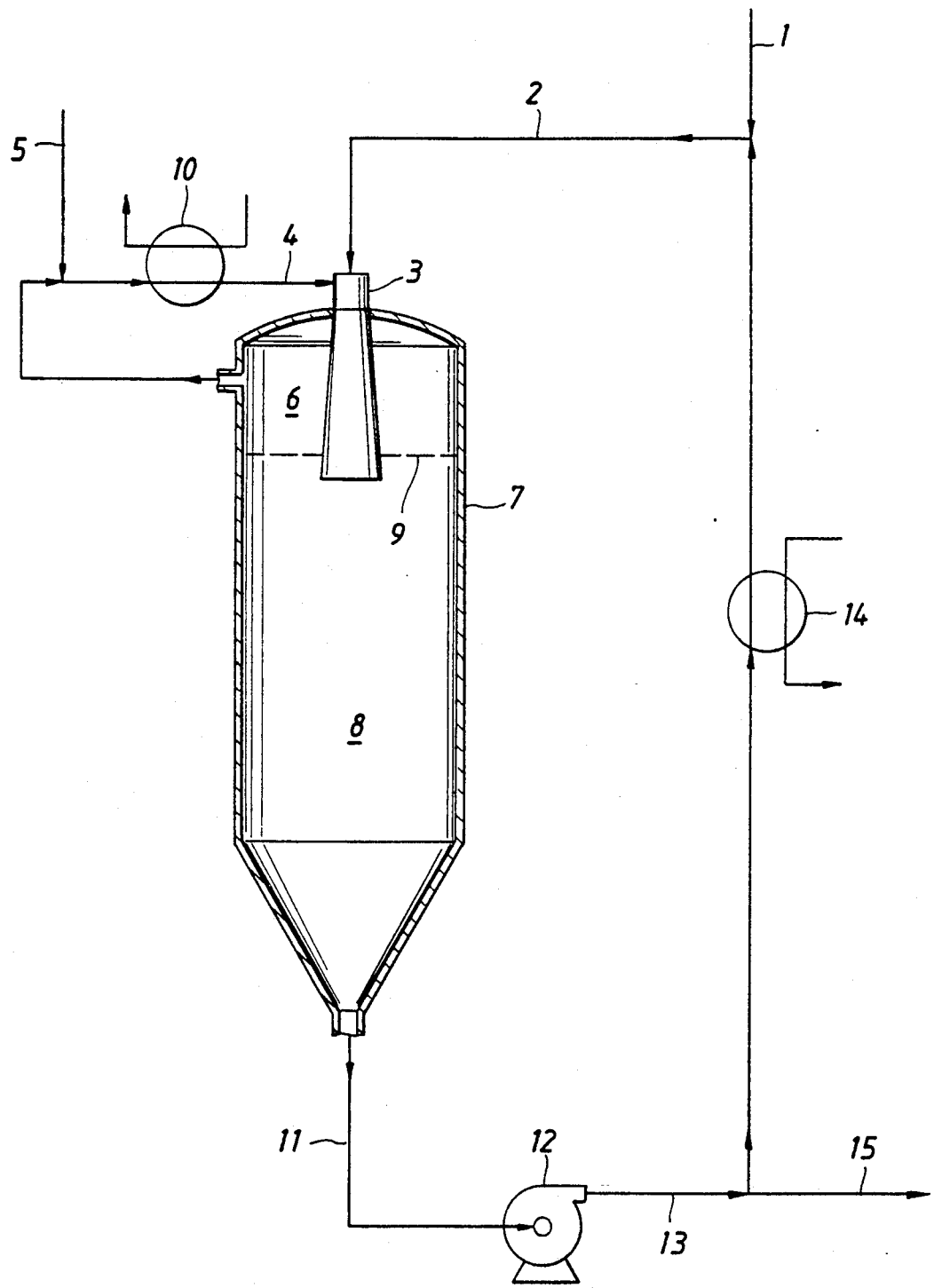

The present process comprises contacting the carbon monoxide and at least one ethylenically unsaturated hydrocarbon under polymerization conditions in the presence of a catalyst composition and a liquid reaction diluent in which the catalyst composition is soluble but in which the polymer product is at least substantially soluble. The catalyst composition is preferably formed from a compound of palladium, an anion of a strong non-hydrohalogenic acid and a bidentate ligand of phosphorus. The contacting of monomers and catalyst composition takes place in at least one suitable reactor employed in conjunction with means for imparting mechanical force or shear to the suspension of polymer product in reaction diluent which is withdrawn continuously from the reactor during polymerization and, after passing through the region in which the mechanical force applies shear to the suspended polymer particles, is returned to the reactor. The reactor is optionally additionally equipped with mechanical stirrers or other means of facilitating agitation within the liquid-phase reaction mixture, but such means alone do not typically apply the desired mechanical force. It is also of advantage to provide the reactor with a gas recycle loop through which is withdrawn a portion of the gas cap over the liquid-phase reaction mixture within the reactor, optionally adjusted in temperature and returned to the reactor through the region of mechanical shear.

Without wishing to be bound by any particular theory, it appears probable that during the polymerization taking place in the liquid-phase reaction mixture, polymer particles are initially produced of rather irregular particle shape. During the passage of the polymer suspension through the region of mechanical shear the irregular particles are rendered more uniform in shape as by shearing off from the particles the more irregular projections. The resulting polymer particles, upon return to the reactor, tend to grow in a more regular or spherical shape with a reduced surface area per unit mass of polymer particle. The resulting more spherical particles have a higher polymer bulk density which is of advantage as discussed above.

The ethylenically unsaturated hydrocarbons that are useful as precursors of the polyketone polymers have up to 20 carbon atoms inclusive but preferably have up to 10 carbon atoms inclusive. Illustrative of such olefinically unsaturated hydrocarbons are ethylene and other α-olefins such as propylene, 1-butene, isobutylene, 1-hexene, 1-octene and 1-dodecene. Also suitable are arylaliphatic hydrocarbons having an aryl substituent on an otherwise aliphatic molecule, particularly an aliphatic substituent on a carbon atom of the ethylene unsaturation. Illustrative of this latter class of ethylenically unsaturated hydrocarbons are styrene, p-methylstyrene, p-ethylstyrene and m-isopropylstyrene. The preferred polyketone polymers produced according to the process of the invention are copolymers of carbon monoxide and ethylene and terpolymers of carbon monoxide, ethylene and a second ethylenically unsaturated hydrocarbon of at least 3 carbon atoms, preferably an α-olefin such as propylene.

The contacting of carbon monoxide and hydrocarbon monomers takes place under polymerization conditions in the presence of a liquid reaction diluent and a catalyst composition produced from a compound of palladium, an anion of a strong non-hydrohalogenic acid and a bidentate ligand of phosphorus. The compound of palladium is preferably a palladium carboxylate and palladium acetate, palladium propionate, palladium butyrate and palladium hexanoate are satisfactory. Palladium acetate is particularly preferred. The anion precursor of the catalyst composition is an anion of a non-hydrohalogenic acid having a pKa below 4 and preferably below 2. Suitable anions are anions of inorganic acids such as sulfuric acid and perchloric acid or organic acids including carboxylic acids such as dichloroacetic acid, trichloroacetic acid and trifluoroacetic acid as well as sulfonic acids such as methanesulfonic acid, trifluoromethanesulfonic acid and p-toluenesulfonic acid. Anions from trifluoroacetic acid and p-toluenesulfonic acid are preferred. The anion is preferably provided as the free acid but in an alternate modification the anion is provided as a metal salt, particularly as the salt of a non-noble transition metal, e.g., as a copper salt or a nickel salt. However provided, the quantity of anion to be employed is from about 1 mole to about 100 moles of anion per mole of palladium. Preferred quantities of anion are from about 2 moles to about 50 moles of anion per mole of palladium.

The bidentate liqand of phosphorus is represented by the formula

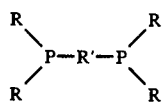

wherein R independently is aliphatic or aromatic of up to 10 carbon atoms inclusive. R is suitably a hydrocarbyl group containing only atoms of carbon and hydrogen or is substituted hydrocarbyl containing additional atoms as inert carbon atom substituents. Suitable aliphatic R groups are methyl, propyl, butyl, hexyl, octyl, 3-chloropropyl, 2-bromobutyl and 7-methoxyheptyl. Suitable aromatic R groups include hydrocarbyl groups such as phenyl, tolyl and xylyl. Preferred R groups, however, are aromatic substituted-hydrocarbyl groups containing at least one polar substituent on an aromatic ring carbon atom located ortho to the ring carbon atom through which the R group is bound to phosphorus. The preferred polar substituent of such R groups is alkoxy of up to 4 carbon atoms and illustrative of the preferred R groups are 2-methoxyphenyl, 2,4-diethoxyphenyl, 2-propoxy-4-methoxyphenyl and 2,4,6-trimethoxyphenyl. The 2-methoxyphenyl group is particularly preferred. The R' group is a divalent hydrocarbyl linking group of up to 10 carbon atoms inclusive with from 2 to 4 carbon atoms in the bridge, as illustrated by 1,2-ethylene, 1,3-propylene, 1,4-butylene, 1,3-butylene, 2,2-dimethyl-1,3-propylene and 2,2,3,3-tetramethyl-1,4-butylene. The preferred R' group is 1,3-propylene (or trimethylene) and the preferred bidentate ligand of phosphorus is 1,3-bis[di(2-methoxyphenyl)-phosphino]propane. The quantity of bidentate phosphorus ligand to be utilized is from about 0.5 mole to about 2 moles per mole of palladium. Preferably, the, quantity of ligand used is from about 0.75 mole to about 1.5 mole of ligand per mole of palladium.

It is also useful on occasion to provide to the catalyst composition mixture an organic oxidizing agent. Such organic oxidizing agents include aliphatic nitrites such as butyl nitrite and amyl nitrite, aromatic nitrocompounds such as nitrobenzene and 2,4-dinitrotoluene, and quinones, both 1,2-quinones and 1,4-quinones. The 1,4-quinones such as 1,4-benzoquinone and 1,4-naphthoquinone are generally preferred. As stated, it is not required to provide organic oxidizing agent and amounts up to about 5,000 moles per mole of palladium are satisfactory. When present, amounts of organic oxidizing agent from about 10 moles to about 1000 moles per mole of palladium are preferred.

The liquid reaction diluent in which the polymerization takes place is a diluent in which the catalyst composition is soluble but in which the polymer product is at least partially insoluble. Suitable reaction diluents include the lower alkanols such as methanol and ethanol and lower alkanones such as acetone and methyl ethyl ketone. Methanol is preferred as the reaction diluent.

Typical polymerization conditions include a reaction temperature of from about 25° C. to about 150° C. but preferably from about 30° C. to about 130° C. The reaction pressure is suitably from about 2 bar to about 150 bar although reaction pressures from about 5 bar to about 100 bar are more commonly encountered. The molar ratio of carbon monoxide to total ethylenically unsaturated hydrocarbon employed in the polymerization is from about 10:1 to about 1:10, although molar ratios from about 5:1 to about 1:5 are preferred. When the preferred terpolymers are produced according to the process of the invention, the molar ratio of ethylene to the second ethylenically unsaturated hydrocarbon of at least 3 carbon atoms will preferably be from about 10:1 to about 100:1. Sufficient catalyst composition is employed to provide from about $1 \times 10^{-7}$ mole to about $1 \times 10^{-3}$ mole of palladium per mole of total ethylenically unsaturated hydrocarbon. Preferred amounts of catalyst composition provide from about $1 \times 10^{-6}$ mole to about $1 \times 10^{-4}$ mole of palladium per mole of total ethylenically unsaturated hydrocarbon.

DETAILED DESCRIPTION OF THE FIGURE

The invention is further illustrated by reference to the Figure which should not be construed as limiting the invention. It should be understood that for clarity the Figure depicts a single reactor for purposes of illustration but the invention, in an alternate embodiment, is practiced by employing a plurality of reactors, e.g., two or three, arranged in series.

Referring to the Figure, a solution of the catalyst composition in methanol is introduced by line 1 and then line 2 which enters the reactor 7 through a means of supplying mechanical shear 3. This means comprises a conventional means for intensive mixing, homogenizing, emulsifying and/or particle size reduction of solid particles in a liquid medium. This means of supplying mechanical shear is suitably a rotor-stator device, a ball-mill or a screw pump but is preferably an injector-mixing nozzle such as is described for an injector mixer in the *Chemical Engineers' Handbook* by J. H. Perry, 3rd Ed. (1953), p. 1203, FIG. 2, or for a venturi as described in the same publication, p. 1285, FIG. 61. Also suitable is the water-jet ejector described in *Unit Operations* by Brown et al, 4th Ed. (1953), p. 194, FIG. 210. Fresh carbon monoxide and hydrocarbon monomers are provided by line 5 which then enter line 4 and thus pass into the reactor 7 by way of the means of supplying mechanical shear 3. Within the reactor, there is a gas cap 6 in the upper portion of the reactor 7 which is preferably less than 40% of the reactor volume and comprises unreacted carbon monoxide and hydrocarbon monomers. Also depicted in a methanolic liquid phase 8 in which the catalyst composition is soluble and in which polymerization takes place to form a slurry of polyketone polymer product particles in the reaction diluent methanol. The dotted line 9 signifies the interface between the gas cap 6 and the liquid phase 8 which is preferably above the exit of the mechanical shear means 3. Optional agitation means, if employed, is not shown.

The suspension of polymer particles in the reaction diluent is withdrawn from the reactor 7 through line 11 and with the aid of pump 12 passes at least in part through line 13 and then line 2 to the means of applying mechanical shear 3 and thence to the reactor 7. The proportion of the polymer slurry removed and recycled is preferably at least 50% of the slurry and preferably is at least 90% of the polymer slurry. The remaining polymer slurry, from about 0.03 to about 1 part by volume per unit volume of the suspension volume in the reactor, is removed from the polymerization system by line 15 and passed to separation means (not shown) where the polyketone polymer is recovered from the polymer slurry by conventional methods such as filtration or centrifugation. The reaction diluent is then separated from spent catalyst composition by conventional means (not shown) such as distillation and subsequent to the addition of make-up catalyst composition is returned to the reactor by lines 1 and 2. The polymer slurry recycle rate is such that an average residence time of from about 1 to about 30 hours is observed.

In order to, in part, control the temperature of the polymerization and increase mixing of the reactants and catalyst composition, a portion of the gaseous monomers is removed from the gas cap 6 and, while passing by line 4, is mixed with the fresh monomer feed provided by line 5. The resulting mixture is contacted with a heat exchanger 10 to raise or lower the temperature of the partially recycled gas mixture which enters the reactor 7 through the mechanical shear means 3. The temperature of the recycled polymer slurry is also controlled, i.e., raised or lowered, by passage through heat exchanger 14 during flow through line 13.

To obtain the benefits of the invention, the recycled polymer slurry must encounter substantial mechanical shear during passage through the mechanical shear means 3. To ensure the sufficiency of the mechanical shear, the concentration of polymer in the slurry should be kept relatively low, e.g., less than about 60% by weight, and substantial power should be transmitted to the suspension. This transmitted power, termed "power density", is preferably from about 0.25 kw/$m^3$ to about 50 kw/$m^3$ of suspension.

Although the Figure represents only a single polymerization reactor, it should be understood that the process could be operated in more than one reactor, operated in series, wherein the polymer suspension removed by line 15 from one reactor is passed to a subsequent reactor system and introduced to that reaction system by line 2. By conducting the polymerization in a series of reactors, polymer product of high bulk density and more uniform particle diameter is obtained.

EXAMPLE

In a specific illustration of the process of the invention, again with reference to the Figure, 0.004 t/d (tons/day) of an equimolar mixture of carbon monoxide and ethylene was introduced by line 5 and mixed with 5 t/d of monomer mixture being recycled from the reactor 7 through line 4 to the side of an injector-mixing nozzle 3. By means of the heat exchanger 10 the combined monomer stream was maintained at 83° C. In the injector-mixing nozzle 3 the monomer stream was mixed with 70 t/d of a polymer suspension of linear alternating carbon monoxide/ethylene copolymer being recycled from the reactor 7 by lines 11, 13 and 2 to the top of the injector-mixing nozzle 3. By means of the heat exchanger 14 the recycled suspension was maintained at a temperature of 83° C. The suspension contained 15% by weight of copolymer. Fresh methanol, 0.23 t/d, containing 3.5 ppmw catalyst composition (as palladium) was supplied to the polymerization system by line 1. The catalyst composition was formed from palladium acetate, trifluoroacetic acid and 1,3-bis[di(2-methoxyphenyl)phosphino]propane.

The polymerization took place at 83° C. and a pressure of 25 bar in the reactor 7 which had a volume of 0.1 $m^3$. The gas cap occupied 30% of the reactor volume.

By way of line 15, 0.027 t/d of suspension of 0.004 t/d of copolymer in 0.023 t/d of methanol plus spent catalyst composition was removed from the system. The copolymer product was separated from the diluent by means of a filter/dryer. After washing and drying, the bulk density of the copolymer was 540 kg/$m^3$ and its average particle size was 80 microns. The production rate of copolymer was 6.3 kg of copolymer/$m^3$ of methanol hr. During recycle of the polymer suspension through the injector-mixing nozzle, the power transmitted to the polymer suspension was 9 kw/$m^3$ of polymer suspension.

What is claimed is:

1. A process for the production of linear alternating polymer of carbon monoxide and at least one ethylenically unsaturated hydrocarbon which comprises:
   (1) contacting carbon monoxide and at least one ethylenically unsaturated hydrocarbon monomer in a reactor system under polymerization conditions in the presence of a liquid reaction diluent and a catalyst composition formed from a compound of palladium, the anion of a strong non-hydrohalogenic acid and a bidentate ligand of phosphorus,
   (2) removing a portion of the resulting polymer suspension in reaction diluent from the reactor, passing a part of that portion from the reactor system as product and passing the remainder of the portion back to the reactor through a means for applying mechanical shear, and (3) removing unreacted monomers from a gas cap within the reactor, mixing the unreacted monomers with carbon monoxide and ethylenically unsaturated hydrocarbon and passing the mixture through the means for applying mechanical shear together with the polymer suspension and back to the reactor.

2. The process of claim 1 wherein concentration of the polymer suspension removed from the reactor, passed through the mechanical shear means and back to the reactor is less than about 60% by weight.

3. The process of claim 1 wherein power transmitted to the polymer suspension by the mechanical shear means is from about 0.25 kw/m$^3$ of polymer suspension.

4. The process of claim 3 wherein the mechanical shear means is an injector-mixing nozzle.

5. The process of claim 3 wherein the ethylenically unsaturated hydrocarbon is ethylene.

6. The process of claim 5 wherein the catalyst composition is formed from a compound of palladium, an anion of a non-hydrohalogenic acid having a pKa below 2 and a bidentate ligand of phosphorus.

7. The process of claim 6 wherein the compound of palladium is palladium acetate.

8. The process of claim 7 wherein the anion is the anion of trifluoroacetic acid or p-toluenesulfonic acid.

9. The process of claim 8 wherein the bidentate ligand of phosphorus is represented by the formula

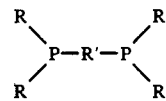

wherein R independently is aliphatic or aromatic of up to 10 carbon atoms inclusive and R, is a divalent hydrocarbon linking group of up to 10 carbon atoms inclusive with from 2 to 4 carbon atoms in the phosphorus-phosphorus bridge.

10. The process of claim 9 wherein R is substituted hydrocarbyl aromatic with at least one polar group substituted on a ring carbon atom ortho to the ring carbon atom through which the group is bound to the phosphorus.

11. The process of claim 10 wherein the bidentate ligand of phosphorus is 1,3-bis[di(2-methoxyphenyl)-phosphino]propane.

12. The process of claim 3 wherein the at least one ethylenically unsaturated hydrocarbon is ethylene and propylene.

13. The process of claim 12 wherein the catalyst composition is formed from palladium acetate, the anion of trifluoroacetic acid or p-toluenesulfonic acid and 1,3-bis[di(2-methoxyphenyl)phosphino]propane.

* * * * *